United States Patent [19]

Nakamura et al.

[11] 4,188,841

[45] Feb. 19, 1980

[54] APPARATUS FOR STRIPPING THE COATINGS OF OPTICAL FIBERS

[75] Inventors: Masaru Nakamura; Takao Itoh, both of Yokohama, Japan

[73] Assignee: Tokyo Shibaura Electric Co., Ltd., Kawasaki, Japan

[21] Appl. No.: 871,350

[22] Filed: Jan. 23, 1978

[30] Foreign Application Priority Data

Jan. 24, 1977 [JP] Japan .................................. 52-5802

[51] Int. Cl.² .......................................... H02G 1/12
[52] U.S. Cl. ................................................. 81/9.51
[58] Field of Search ............ 30/90.1; 81/9.5 R, 9.5 C, 81/9.51

[56] References Cited

U.S. PATENT DOCUMENTS

| | | | |
|---|---|---|---|
| 2,133,005 | 10/1938 | Wollenweber | 81/9.5 R |
| 2,306,403 | 12/1942 | Mortensen | 81/9.5 C |
| 2,802,259 | 8/1957 | Stoner | 81/9.5 C X |
| 3,527,124 | 9/1970 | Ullman | 81/9.51 |
| 3,875,601 | 4/1975 | Kaufman | 81/9.5 R X |

Primary Examiner—James G. Smith
Attorney, Agent, or Firm—Frishauf, Holtz, Goodman & Woodward

[57] ABSTRACT

The apparatus is provided with a pair of opposed blades having sharp edges intersecting at an angle and blunt parallel edges contiguous to the sharp edges and spaced a minimum spacing which is larger than the diameter of the optical fiber clad but smaller than the outer diameter of the coating coated on the optical fiber. Accordingly when the coated optical fiber is urged between the blades, the coating is cut from the opposite sides of the blunt parallel edges except for a small thickness of the coating so that the coating can be readily removed without injuring the fiber clad. When the optical fiber is pulled outward from the apparatus, the coating portion to be removed is stripped without imparting any injury to the fiber clad.

15 Claims, 17 Drawing Figures

APPARATUS FOR STRIPPING THE COATINGS OF OPTICAL FIBERS

BACKGROUND OF THE INVENTION

This invention relates to apparatus for removing the coating of an optical fiber.

In recent years the possibility of practical optical communication systems has become prosperous due to the technological advances in optical fibers that can transmit light with low loss. In such a system in order to efficiently bond together independent optical fibers or to connect a light source or a light receiver to optical fibers, it is necessary to remove or strip the protective coatings formed by applying a chemical substance onto the optical fibers. Usually, nylon or polyethylene is used as the coating material. Accordingly, it is important to efficiently remove the coatings from the optical fibers without injuring the surface of the fiber clad or the primary body of the optical fiber for effecting transmission.

One example of a prior art apparatus for stripping the optical fiber coating is disclosed in H. Murata et al paper presented before "First European Conference on Optical Fiber Communication", I.E.E. 16-18, September 1975, entitled "Splicing of Optical Fiber Cable on Site". According to the coating stripper disclosed in this paper, the coating on the portions of the optical fibers to be stripped are crumpled by a press head, and the coatings are cut by a pair of opposing blades. Thereafter, the optical fibers and the stripper are separated from each other, thereby removing the coatings. With such a stripper, however, as the blades are moved relative to the optical fibers during the stripping operation, it is difficult to maintain the gap between the cutting edges of the blades at a correct value. Moreover, the two blades often offset from the same plane, and the relative motion between the blades and the optical fibers during the stripping operation often becomes non-linear. For this reason, with the coating stripper described above, it is difficult to efficiently remove the coating without injuring the fiber clads.

In addition to the coating stripper described above, the following methods have been used. According to one method, the coatings on the optical fibers are burned off, while according to another method, the coatings are manually slit by a sharp knife blade and then removed by hand. However, according to the former method, the coatings at portions not desired to be removed undergo extreme thermal deformation, whereas according to the latter method, not only the stripping operation is troublesome but also there is a tendency of injuring the optical fiber clads.

SUMMARY OF THE INVENTION

Accordingly, it is an object of this invention to provide improved apparatus for stripping optical fiber coatings capable of accurately and readily stripping the coatings without deforming or injuring the optical fibers.

According to this invention there is provided an apparatus for stripping a coating of an optical fiber, comprising a frame having a gap through which a coated optical fiber is passed; and a pair of opposing blades mounted on said frame in a manner that the direction in which either end of a pair sharp cutting edges of said blades is disposed opposing the other defines an acute angle with the direction in which said fiber is carried into said gap and said cutting edges protruding into said gap not parallel with each other so as to define a minimum spacing therebetween, said minimum spacing being larger than the diameter of the clad of said fiber but smaller than the outer diameter of the coating of said fiber so that said coating is cut by said cutting edges from the opposite sides thereof. The blades have parallel blunt edges extending below said minimum spacing, the blunt edges having a thickness larger than that of the cutting edges.

BRIEF DESCRIPTION OF THE DRAWINGS

Throughout the drawings corresponding elements are designated by the same reference characters.

DETAILED DESCRIPTION OF THE PREFERRED EMBODIMENTS

Figure 1:
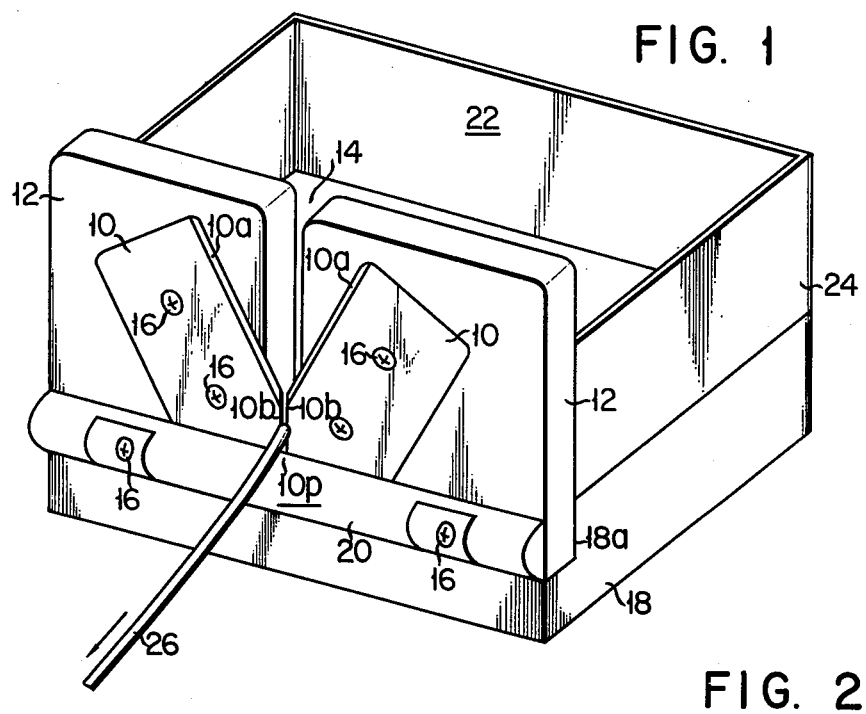
FIG. 1 is a perspective view showing one embodiment of a coating stripper according to this invention.

As shown in FIG. 1 a pair of opposed blades 10 each having a sharp edge 10a and a blunt edge 10b are secured to frames 12 by screws 16, the frames being spaced by a center gap 14. Each blade takes the form of a safety razor blade and the two blades are secured to the frames such that the blades are symmetrical with respect to the center line of the gap 14 and the blunt edges 10b are parallel with each other. A parallel part 10p or the spacing between opposing blunt edges 10b is made slightly larger than the diameter of a bare optical fiber clad. Particularly, it has experimentally been found that the stripping operation can be performed satisfactorily when the spacing is made approximately less than the half of the sum of the respective diameters of the fiber clad and the fiber coating. Furthermore, it is advantageous to make the thickness of the blunt edges 10b to be a little larger than that of the sharp edges 10a. The blades are secured such that the parallel blunt edges are symmetrically disposed with respect to the center line of the gap 14, whereas the sharp edges 10a are inclined symmetrically with respect to the center line.

The frames 12 secured with the blades 10 are mounted on a shoulder 18a at the front end of a base 18 with the sharp edges 10a faced upwardly and then fastened by means of a semicircular clamping member 20 and screws 16, a. A side plate 24 is mounted on the base 18 to form a scrap box 22 for receiving stripped coating.

The stripping apparatus described above operates as follows. An optical fiber 26 to be stripped is inserted obliquely into the gap 14 from above and then urged downwardly and obliquely toward parallel part 10p. Then the corners between the sharp edges and the blunt edges cut through the coating in a manner that the resulting slits of the coating are symmetrical about the fiber 26. As the coated fiber is advanced, the slits formed by aforesaid cutting operation are widened by means of the blunt edges 10b by the extent of the thickness thereof. At this time, the coating portion desired to be stripped is separated from the coating portion desired to remain unstripped, though slightly. Then the fiber 26 is pulled in a direction shown by a thin arrow. In this manner, the coating is removed without injuring the fiber clad.

Figure 2:
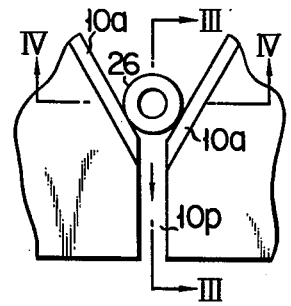
FIG. 2 is a side view showing a state immediately before a pair of blade edges cut through a fiber coating.
Figure 3:
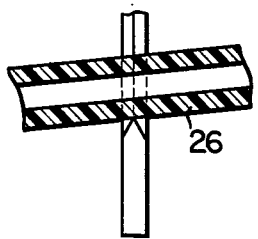
FIG. 3 is a sectional view taken along a line III—III in FIG. 2.
Figure 4:
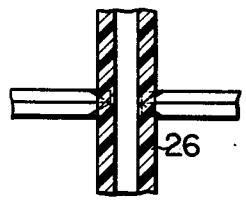
FIG. 4 is a longitudinal sectional view taken along a line IV—IV in FIG. 2.
Figure 5:
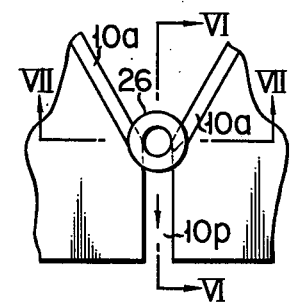
FIG. 5 is a side view showing a state in which the pair of blade edges have partially cut through the fiber coating.
Figure 6:
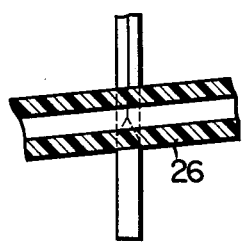
FIG. 6 is a sectional view taken along a line VI—VI in FIG. 5.
Figure 7:
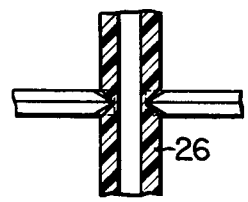
FIG. 7 is a longitudinal sectional view taken along a line VII—VII in FIG. 5.
Figure 8:
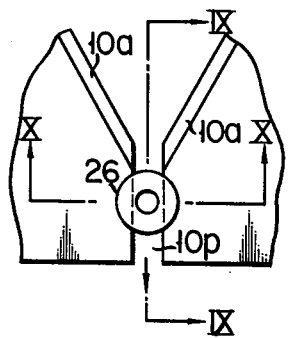
FIG. 8 is a side view showing a state in which the parallel portions of the pair of blades have been completely cut through the coating.
Figure 9:
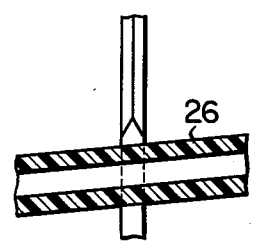
FIG. 9 is a sectional view taken along a line IX—IX in FIG. 8.
Figure 10:
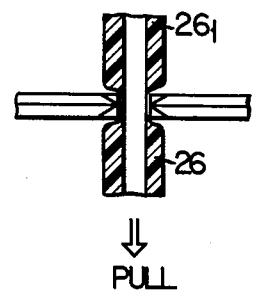
FIG. 10 is a longitudinal sectional view taken along a line X—X in FIG. 8.

The above described operation will be described in more detail with reference to FIGS. 2 through 10. More particularly, FIGS. 2, 3 and 4 show a state immediately before the corners between the sharp edges and the blunt edges cut into the coating of the fiber 26, whereas FIGS. 5, 6 and 7 show a state in which the corners have partially cut into the coating as a result of pulling downwardly the coated fiber. FIGS. 8, 9 and 10 show a state wherein the blunt edges have widened the slits. (At this time, only a small thickness of the coating remains uncut.) Accordingly, when the fiber is pulled down as shown further by a thick arrow in FIG. 10, such coating portion $26_1$ desired to be stripped is readily severed to completely remove the coating.

Figure 12:
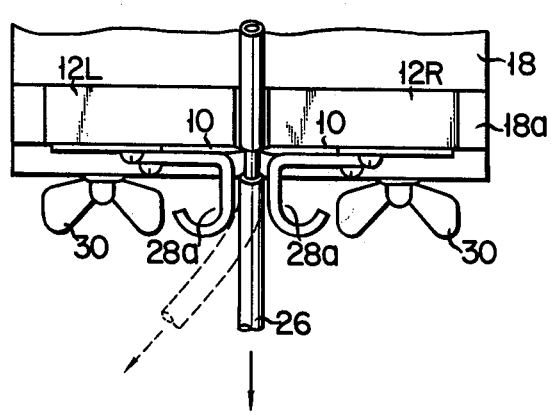
FIG. 12 is a partial upper view of the modified embodiment shown in FIG. 11.
Figure 11:
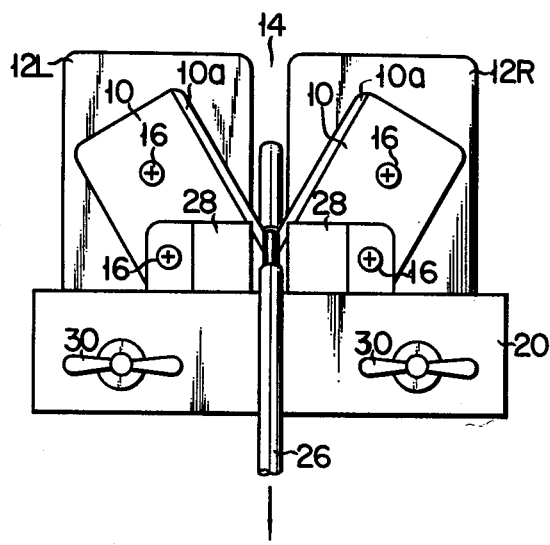
FIG. 11 is a front view showing another embodiment of this invention.
Figure 13:
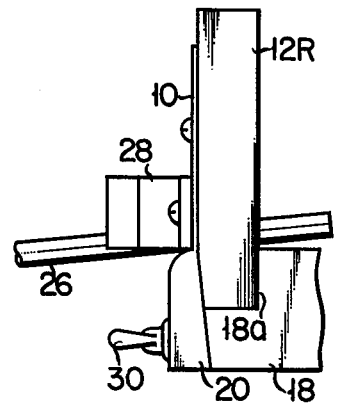
FIG. 13 is a right side view of the embodiment shown in FIG. 11.

FIGS. 11, 12 and 13 show another embodiment of the stripping apparatus of this invention in which the frame 12 is divided into two blocks 12L and 12R which are slidably mounted on the shoulder 18a of the base 18. Fiber guide members 28 are secured to the blocks 12L and 12R together with blades 10 by means of screws 16 such that the blunt edges 10b of the blades 10 and guide walls 28a at the inner ends of the guide members 28 project slightly beyond the inner side edges of the blocks 12L and 12R, that the sharp edges 10a, blunt edges 10b and guide walls 28a are symmetrical with respect to the center line of the gap 14 defined between the opposing edges of the blocks 12L and 12R, and that the guide walls 28a are parallel with each other.

After mounting the blocks 12L and 12R on the shoulder 18a with a predetermined gap therebetween, they are fastened to the base by clamping member 20 and wing nuts 30. The upper portion of the clamping member 20 that comes into contact with the coating of the optical fiber 26 is rounded as shown in FIG. 13. The blades 10 have the same in the previous embodiment and are secured to the blocks 12L and 12R with their blunt edges 10b disposed parallely. The spacing between parallel blunt edges is selected in the same manner as has been pointed out hereinabove.

The modified stripping apparatus operates in the same manner as in the first embodiment. However, in this modification even when the coated fiber is pulled laterally as shown by dotted lines in FIG. 12, the portion of the fiber from which the coating is to be removed is maintained substantially straight by the action of guide members 28. Even when the coated fiber is not pulled straight, there is no fear of applying undue shear stress to the fiber clad which tends to break the fiber clad. In the stripping apparatus shown in FIGS. 11 to 13, since the spacing between the parallel part or the blunt edges of the pair of blades can be readily adjusted by sliding blocks 12L and 12R and by the operation of wing nuts 30, it is possible to apply the apparatus to the stripping of fibers having different diameters.

Figure 14:
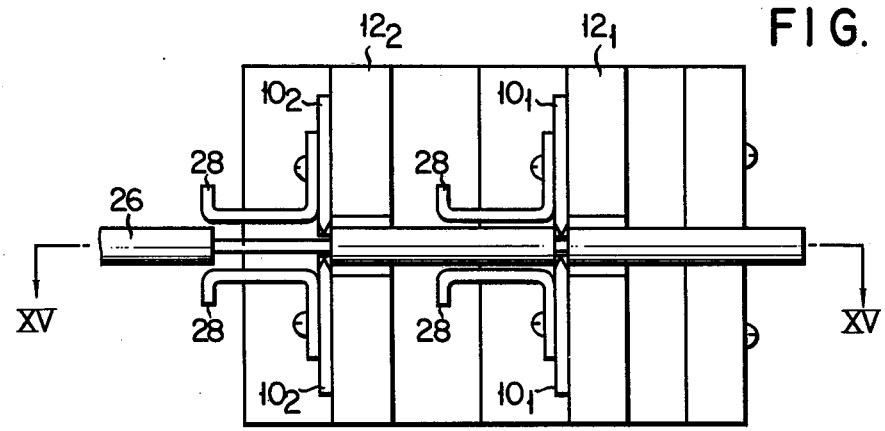
FIG. 14 is an upper plan view showing still another modification of this invention.
Figure 15:
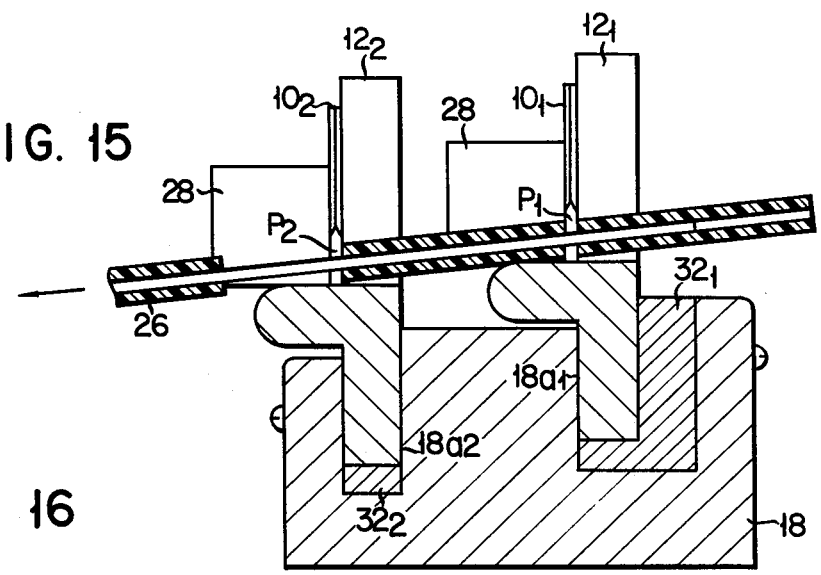
FIG. 15 is a longitudinal sectional view of the modification shown in FIG. 14 taken along a line XV—XV.

In the embodiment shown in FIGS. 14 and 15, a plurality of pairs of blades are used. More particularly, two frames $12_1$ and $12_2$ each provided with a pair of blades 10 and a pair of guide members 28 are mounted on the step shaped shoulders $18a_1$ and $18a_2$ of the base 18 together with spacers $32_1$ and $32_2$. As shown in FIG. 14, frames $12_1$ and $12_2$ are secured symmetrically with respect to the longitudinal axis of the fiber 26. The differences in the horizontal spacings and the heights of the frames $12_1$ and $12_2$ are determined experimentally to suit different types of fibers to be stripped. The horizontal spacings and the heights of the frames $12_1$ and $12_2$ can be adjusted to any value by changing the configuration of the spacers $32_1$ and $32_2$.

The operation of this stripping apparatus is as follows. A fiber 26 to be stripped is obliquely inserted from above to engage a portion $P_1$ thereof against the corners of the sharp edges of blades $10_1$. Then the fiber is pulled downwardly and obliquely so as to cause the corner portions of the blades $10_1$ to cut through the coating. At the same time, the corners of the sharp edges of the blades $10_2$ also cut through the coating at portion $P_2$. As the fiber is pulled down further the coating is cut and stripped at both portions $P_1$ and $P_2$.

If the coating of a thin optical fiber were stripped by a single stage apparatus as shown in FIG. 1 and FIGS. 11-13, over a substantial length, the coating would be subjected to undue tension stress, thus severing the fiber. Accordingly, with the single stage stripping apparatus, it is necessary to successively perform stripping operations over a short length in order to strip the coating over a large length. On the contrary, with the two stage stripping apparatus shown in FIGS. 14 and 15, it is possible to increase the length of stripping in which the coating can be readily stripped without creating undue stress. If desired, it is of course possible to provide three or more stages of the blades.

Figure 16:
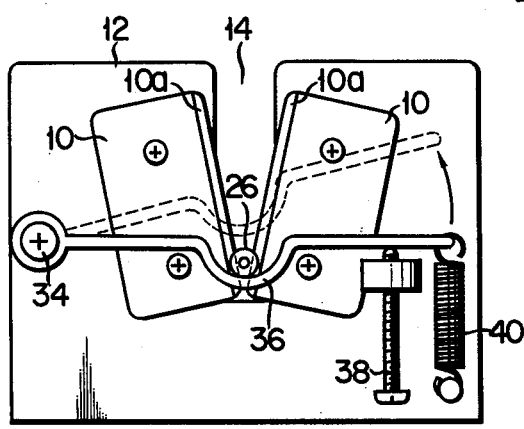
FIG. 16 is a front view showing still another embodiment of this invention.

In a still further modification of this invention shown in FIG. 16, a pair of blades 10 are disposed symmetrically with respect to the center line of the gap 14 between frames 12 but inclined oppositely with respect to the center line. The blades have sharp edges 10a over their entire length and are not provided with parallel blunt edges. The relative angle between the sharp edges 10a is determined by an adjusting member 36, and the coating of the fiber 26 is cut by the sharp edges 10a at their lower ends where the spacing therebetween is minimum. The adjusting member 36 is pivotally supported by a pivot pin 34 and its position is adjusted by a spring 40 and a screw 38. When the adjusting member 36 is set to a position shown by dotted lines, it is possible to strip the coatings of fibers having larger diameter. Use of the screw 38 permits fine adjustment of the minimum gap at which the coating is cut. Instead of rotating the positioning member 36, it is possible to adjust it in the vertical direction while maintaining it in the horizontal direction.

Figure 17:
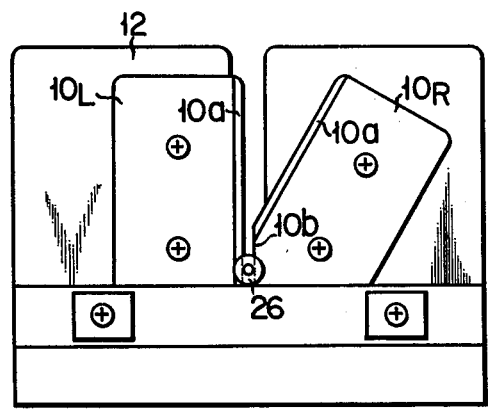
FIG. 17 is a front view showing yet another embodiment of this invention.

In another modification shown in FIG. 17, one blade 10L has a vertical sharp edge 10a whereas the other blade 10R has an inclined sharp edge 10a and a vertical blunt edge 10b similar to that shown in FIG. 1. The sharp edge 10a of blade 10L and the blunt edge 10b of blade 10R are disposed in parallel. With this construction, the coating is cut at the corner between the sharp edge 10a and the blunt edge 10b of blade 10R and the sharp edge 10a of the blade 10L. The edge of the blade 10L confronting the blunt edge 10b of the blade 10R may be blunt.

With any one of the foregoing embodiments, the coating is cut symmetrically from the opposite sides thereof by opposing blades. Accordingly, so long as the minimum gap between the blades is properly selected with respect to the diameter of the fiber to be stripped, it is possible to always assure adequate cutting depth, thus preventing injuring of the fiber. Since the pair of blades are firmly secured to the frames, the accuracy of the minimum gap that is the depth of cutting can be maintained to a high degree. Moreover, the cutting edges of the blades are always maintained in parallel, thus enabling efficient stripping, without imparting any injury to the fiber clad. As the minimum gap can be readily adjusted, the apparatus of this invention is applicable to fibers having different diameters.

What we claim is:

1. An apparatus for stripping off a coating of a coated optical fiber, comprising:
    a frame (12) having a first gap (14) formed at one side thereof and extending toward the other side thereof and through which a coated optical fiber (26) is passable; and
    a pair of opposing blades (10) each having sharp cutting edges (10a) mounted on said frame (12) with said sharp cutting edges generally opposing each other with a second gap therebetween, said sharp cutting edges being in communication with said first gap (14), said blades being mounted such that the direction in which both of said sharp cutting edges (10a) is disposed defines an acute angle with the direction in which said fiber (26) is passable into said first gap (14), said sharp cutting edges (10a) protruding into said first gap (14) non-parallel with each other so as to define a minimum spacing therebetween, said minimum spacing being larger than the diameter of the clad of said optical fiber but slightly less than a predetermined value d, said value d being equal to half of the sum (d1+d2), wherein d1 is the diameter of the fiber clad and d2 is the outer diameter of the coating of said optical fiber so that said coating is cut by said sharp cutting edges (10a) from opposite sides of said coating; and said blades (10) having respective blunt edges (10b) extending from said sharp cutting edges (10a) below said minimum spacing, said blunt edges (10b) of said blades being substantially parallel to each other and having a thickness larger than that of said sharp cutting edges (10a).

2. Apparatus according to claim 1 further comprising a pair of substantially parallel opposed guide members (28) secured to said frame (12), said guide members (28) being spaced apart a distance sufficient to freely pass said coated optical fiber (26) therebetween.

3. Apparatus according to claim 1 wherein said frame (12) is divided into two sections (12L, 12R), each section carrying one of said blades (10), and further comprising a base (18) on which said frame sections (12L, 12R) are mounted with said gap (14) therebetween, said frame sections carrying said blades to define said minimum spacing between said sharp cutting edges (10a).

4. An apparatus for stripping off a coating of a coated optical fiber, comprising:
    a frame (12) having a first gap (14) formed at one side thereof and extending toward the other side thereof and through which a coated optical fiber (26) is passable; and
    first and second opposing blades (10), having respective first and second substantially straight sharp cutting edges (10a), mounted on said frame (12) with said sharp cutting edges generally opposing each other with a second gap therebetween, said sharp cutting edges being in communication with said first gap (14), said blades being mounted such that the direction in at least one of said substantially straight sharp cutting edges (10a) is disposed defines an acute angle with the direction in which said fiber (26) is passable into said first gap (14), said substantially straight sharp cutting edges (10a) protruding into said first gap (14) non-parallel with each other so as to define a minimum spacing therebetween, said minimum spacing being larger than the diameter of the clad of said optical fiber but smaller than the outer diameter of the coating of said optical fiber so that said coating is cut by said substantially straight sharp cutting edges (10a) from opposite sides of said coating; and one of said blades (10) having a blunt edge (10b) extending from said substantially straight sharp cutting edge (10a) below said minimum spacing, said blunt edge (10b) of said one blade being substantially parallel to said substantially straight sharp edge of the other of said blades and having a thickness larger than that of said sharp cutting edges (10a).

5. Apparatus according to claim 4 wherein said minimum spacing is slightly less than a predetermined value d, said value d being equal to half of the sum (d1+d2), wherein d1 is the diameter of the fiber clad and d2 is the outer diameter of the fiber coating.

6. Apparatus according to claim 4 wherein said frame (12) is divided into two sections (12L, 12R), each section carrying one of said blades (10), and further comprising a base (18) on which said frame sections (12L, 12R) are mounted with said first gap (14) therebetween, said frame sections carrying said blades to define said minimum spacing between said sharp cutting edges (10a).

7. Apparatus according to claim 6 wherein said frame sections (12L, 12R) are slidably mounted on said base (18) for adjusting said minimum spacing between said sharp cutting edges (10a).

8. Apparatus for stripping off a coating of a coated optical fiber, comprising:
    a frame (12) having a first gap (14) formed at one side thereof and extending toward the other side thereof and through which a coated optical fiber (26) is passed; and
    a pair of opposing blades (10) each having sharp cutting edges (10a) mounted on said frame (12) with said sharp cutting edges generally opposing each other with a second gap therebetween, said sharp cutting edges being in communication with said first gap (14), said blades being mounted such that the direction in which both of said sharp cutting edges (10a) is disposed defines an acute angle with the direction in which said fiber (26) is passable into said first gap (14), said sharp cutting edges (10a) protruding into said first gap (14) non-parallel with each other so as to define a minimum spacing therebetween, said minimum spacing being larger than the diameter of the clad of said optical fiber but smaller than the outer diameter of the coating of said optical fiber so that said coating is cut by said sharp cutting edges (10a) from opposite sides of said coating and positioning means including a positioning member (36) pivotally mounted (34) to said frame (12) and against which said coated optical fiber (26) bears and is supported when the stripping operation is performed, and adjusting means (38, 40) coupled to said positioning member (36) for moving said positioning member (36) along said sharp cutting edges of said blades (10) for varying the value of said minimum spacing.

9. Apparatus according to claim 8 wherein said positioning member (36) extends across said second gap between said sharp cutting edges of said blades and is pivotally mounted to said frame on one side of said second gap, said adjusting means being coupled to said positioning means on the other side of said second gap for adjusting the position of said positioning means (36) along said second gap to vary the value of said minimum spacing.

10. An apparatus for stripping off a coating of a coated optical fiber comprising:
    a frame (12) having a first gap (14) formed at one side thereof and extending toward the other side thereof and through which a coated optical fiber (26) is passable;
    a pair of opposing blades (10) each having sharp cutting edges (10a) mounted on said frame (12) with said sharp cutting edges generally opposing each other with a second gap therebetween, said sharp cutting edges being in communication with said first gap (14), said blades being mounted such that the direction in which both of said sharp cutting edges (10a) is disposed defines an acute angle with the direction in which said fiber (26) is passable into said first gap (14), said sharp cutting edges (10a) protruding into said first gap (14) non-parallel with each other so as to define a minimum spacing therebetween, said minimum spacing being larger than the diameter of the clad of said optical fiber but smaller than the outer diameter of the coating of said optical fiber so that said coating is cut by said sharp cutting edges (10a) from opposite sides of said coating; and said blades (10) having respective blunt edges (10b) extending from said sharp cutting edges (10a) below said minimum spacing, said blunt edges (10b) of said blades being substantially parallel to each other and having a thickness larger than that of said sharp cutting edges (10a); and
    a pair of substantially parallel opposed guide members (28) secured to said frame (12), said guide members (28) being spaced apart a distance sufficient to freely pass said coated optical fiber (26) therebetween.

11. An apparatus for stripping off a coating of a coated optical fiber, comprising:
    a frame (12) having a first gap (14) formed at one side thereof and extending toward the other side thereof and through which a coated optical fiber (26) is passable, said frame being divided into two sections (12L, 12R);
    a pair of opposing blades (10) each having sharp cutting edges (10a) and each being mounted on a respective section of said frame (12) with said sharp cutting edges generally opposing each other with a second gap therebetween, said sharp cutting edges being in communication with said first gap (14), said blades being mounted such that the direction in which both of said sharp cutting edges (10a) is disposed defines an acute angle with the direction in which said fiber (26) is passable into said first gap (14), said sharp cutting edges (10a) protruding into said first gap (14) non-parallel with each other so as to define a minimum spacing therebetween, said minimum spacing being larger than the diameter of the clad of said optical fiber but smaller than the outer diameter of the coating of said optical fiber so that said coating is cut by said sharp cutting edges (10a) from opposite sides of said coating; and said blades (10) having respective blunt edges (10b) extending from said sharp cutting edges (10a) below said minimum spacing, said blunt edges (10b) of said blades being substantially parallel to each other and having a thickness larger than that of said sharp cutting edges (10a); and
    a base (18) on which said frame sections (12L, 12R) are mounted with said first gap (14) therebetween, said frame sections carrying said blades to define said minimum spacing between said sharp cutting edges (10a).

12. Apparatus according to claim 11 wherein said frame sections (12L, 12R) are slidably mounted on said base (18) for adjusting said minimum spacing between said sharp cutting edges (10a).

13. Apparatus according to claim 12 wherein said frame members are respective blocks.

14. Apparatus according to claim 11 further comprising an additional pair of frame members ($12_2$), each additional frame member carrying an additional blade ($10_2$), said additional frame members ($12_2$) being mounted on said base (18) at a level lower than said two first mentioned frame members ($12_1$), such that the minimum spacings of the two pair of frame members ($12_1$, $12_2$) are aligned in the direction of passing of said coated optical fiber (26).

15. Apparatus according to claim 14 wherein all of said frame members ($12_1$, $12_2$) are respective blocks.

* * * * *